United States Patent
Heckmann et al.

(10) Patent No.: US 6,571,163 B1
(45) Date of Patent: May 27, 2003

(54) ELECTRICALLY CONTROLLED, DECENTRALIZED CONTROL SYSTEM IN A VEHICLE

(75) Inventors: Hans Heckmann, Karlsruhe (DE); Reinhard Weiberle, Vaihingen/Enz (DE); Bernd Kesch, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/653,068

(22) Filed: Sep. 1, 2000

(30) Foreign Application Priority Data

Sep. 1, 1999 (DE) .......................... 199 41 481

(51) Int. Cl.[7] ................................ H02P 1/54
(52) U.S. Cl. ................ 701/70; 701/78; 318/108; 318/362; 318/370
(58) Field of Search .................. 701/70, 71, 78, 701/74, 83; 318/139, 362, 370, 368, 369, 108, 440; 180/65.3, 65.4; 303/113.4, 155, 20, 146, 181, 122, 11, 7; 108/171, 170

(56) References Cited

U.S. PATENT DOCUMENTS 5,962,997 A * 10/1999 Maisch ...................... 318/108
6,232,674 B1 * 5/2001 Frey et al. .................. 307/10.1

FOREIGN PATENT DOCUMENTS

DE    195 37 464    4/1997
DE    196 34 567    3/1998

* cited by examiner

Primary Examiner—Thomas G. Black
Assistant Examiner—Arthur D. Donnelly
(74) Attorney, Agent, or Firm—Kenyon & Kenyon

(57) ABSTRACT

An electrically controlled, decentralized control system in a vehicle includes at least two energy sources which are independent of one another and at least two control units. In addition, at least one high-current load is allocated to each control unit. The high-current load is permanently allocated to one of the energy sources, while the control units are selectively switchable to the one or the other energy source.

10 Claims, 2 Drawing Sheets

ELECTRICALLY CONTROLLED, DECENTRALIZED CONTROL SYSTEM IN A VEHICLE

FIELD OF THE INVENTION

The present invention relates to an electrically controlled, decentralized control system in a vehicle, for example, a braking system.

BACKGROUND INFORMATION

In the case of such control systems, which are generally not equipped with a mechanical, hydraulic or pneumatic backup system that ensures the functioning of the control system in the case of a fault, special attention must be placed on availability, even in the event of a fault. An example for an electrically controlled, decentralized, braking system which satisfactorily meets the demands placed is described in German Patent No. 196 34 567 (GB 2 316 726 B). This known braking system for a motor vehicle (brake-by-wire) has a decentralized design and is made of various control modules, at least one control module for ascertaining the driver's braking input (desire) and control modules, allocated to individual vehicle wheels, for adjusting the braking force. In addition, to ensure the energy supply, two energy sources or vehicle electrical systems are provided which are independent of one another. To guarantee that the control system is at least partially operable, even in the event one of these energy sources or vehicle electrical systems fails, provision is made to power the central control module for ascertaining the driver's input from both energy sources, and to allocate the control modules for adjusting the braking force either to one or the other energy source, this allocation being carried out in such a way that, if the one energy source fails, at least a part of the wheel brakes remains operable. In this context, the allocation of the energy sources to the individual elements is permanent, the allocation of the high-current loads (e.g., actuators of the wheel brakes) to the energy sources not being addressed.

A solution for the last-named problem can be gathered from German Patent No. 195 37 464. A decentralized braking system is proposed there, as well, in which at least two energy sources are provided that are independent of one another. To ensure the operability of the braking system in the event one of these energy sources fails, a first group of wheel-brake actuators is allocated to the first energy source, and a second group of wheel-brake actuators is allocated to the second energy source. The energy sources are permanently wired to the elements to be powered in this case, as well.

The permanent wiring for the energy distribution, known from the related art, restricts the flexibility of the system, particularly if an energy source fails.

Therefore, an object of the present invention is to improve the distribution of energy in an electrically controlled, decentralized control system in a vehicle.

SUMMARY OF THE INVENTION

A separation is made between the energy supply of the high-current loads (actuators and power output stages) and the control units, the control units advantageously being decoupled from line-conducted disturbances and voltage drops on the energy line which are caused by the power electronics of the high-current loads.

In an advantageous manner, a permanent wiring of the high-current loads is provided, while the control units and low-current loads (e.g., retaining brake) are switched via a central switching element. This central switching element is connected to both energy sources, so that if one of the energy sources fails, the energy supply of the control units can advantageously be switched over to a different energy circuit. In this manner, an energy redundance is provided, availability of the control system is increased and flexibility is expanded.

Due to the separation of the energy supply of the high-current loads and of the control units and low-current loads, respectively, if the power unit or a connected energy path fails, the control unit advantageously remains fully functional. Therefore, it can be utilized for further evaluation of sensor signals, for monitoring the overall system and/or for activation or energy supply of low-current loads, e.g., a retaining brake.

The energy distribution, described in the following, advantageously allows a separation of each individual element from the energy supply when this element exhibits or is causing faulty conditions.

In a braking system, a retaining brake must continue to be able to be actuated if one of the energy circuits fails. This is necessary in a braking system in order to release an applied actuator.

It is particularly advantageous that a computer-controlled switch-on and/or switch-off strategy of the overall system can be provided which is simple to implement. In this context, for example, an after-run is established to allow the execution of functions such as clearance (air gap) adjustment, data protection, etc., until the final switch-off. Upon switching on, a central switching element connecting the energy supply allows a time-synchronous, controlled switch-on of the control units.

Advantageously, this energy distribution is used not only in the case of the preferred exemplary embodiment of a decentralized braking system, but also for other decentralized control systems in the field of vehicle technology, such as steering systems and actuating systems having, for example, a plurality of electromotors, or for internal combustion engines having at least two independent cylinder banks, etc.

DETAILED DESCRIPTION

The energy distribution, according to the present invention, of a decentralized control system is illustrated in the following on the basis of an electrically controlled, decentralized braking system, particularly for a braking system having electromotive application of the wheel brakes, in which electromotors are used as brake actuators. The energy distribution according to the present invention is also used for other decentralized control systems in corresponding manner, whereby the advantages described are achieved, for example, for steering systems or actuating systems, in which high-current loads are used as control elements (electromotors at several vehicle wheels as drive aggregates, servomotors in the case of an internal combustion engine having at least two independent cylinder banks). The energy distribution described is also used in decentralized braking systems, in which hydraulic or pneumatic actuators are utilized, that are operated via valves, it being possible to provide pneumatic or hydraulic backup systems. The energy distribution illustrated can also be used for decentralized hybrid systems in which, for example, actuators with electromotive application are used at a first axle and electrohydraulic actuators with or without hydraulic backup circuit are used at another axle.

The control system, for which the energy distribution is described in the following, is made of a plurality of control units with the associated power output stages, to which high-current loads are connected. In general, the control units need small currents up to a few amperes, while the high-current loads connected to the power output stages can possibly need over 100 amperes of current. Since the power output stages and the control units do not have to be accommodated in one housing, but rather can be separated, the basis of the energy supply is a separation of the energy supply for the high-current loads and for the control units.

Figure 1:
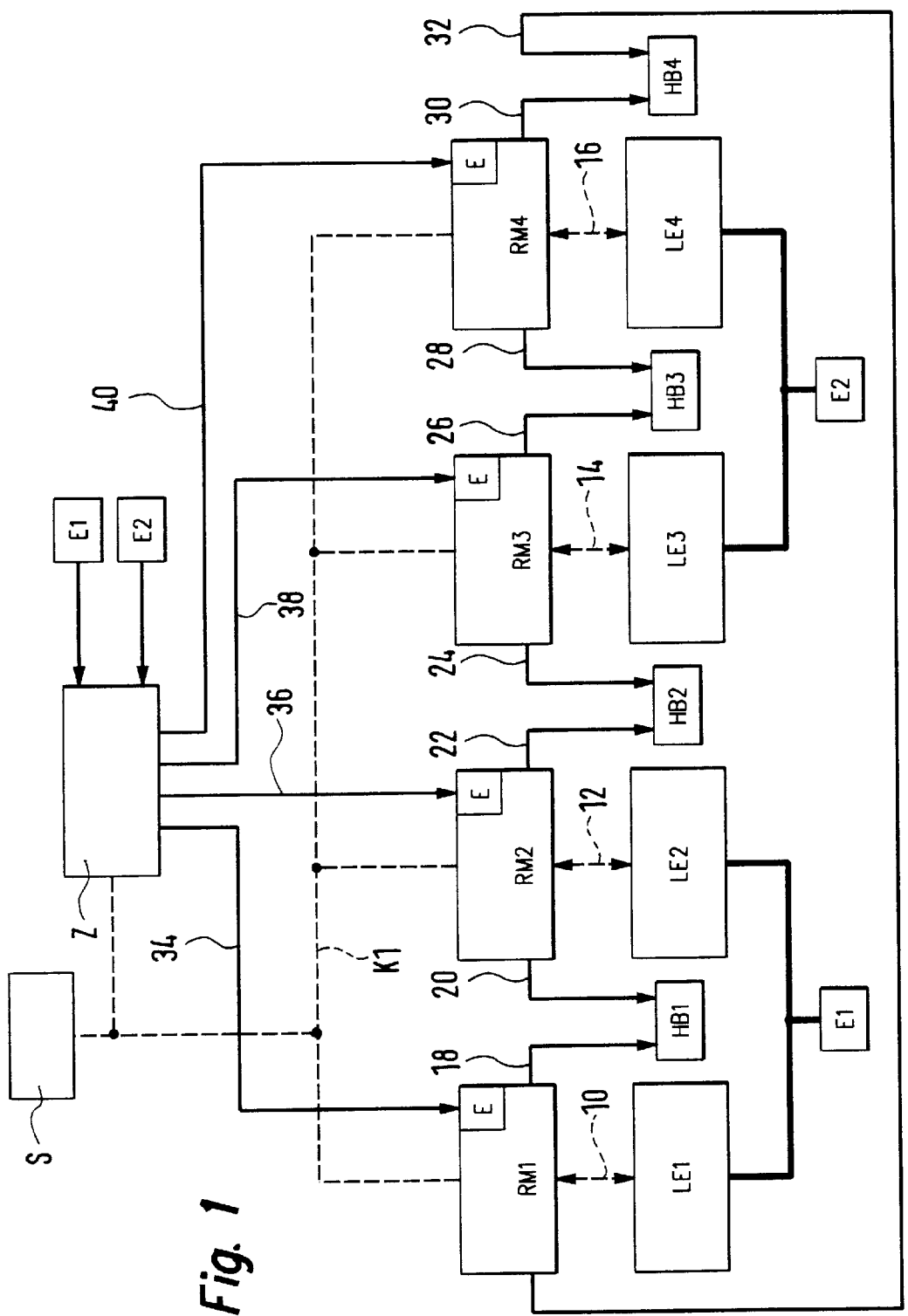
FIG. 1 shows a first exemplary embodiment of an electrically controlled, decentralized braking system, based on which the energy distribution according to the present invention is shown.

The electromechanical braking system of a motor vehicle shown in FIG. 1 is a typical example for a decentralized control system. In the example shown, this control system is composed of four control units (wheel modules RM1 through RM4) and four power output stages (LE1 through LE4), allocated to them, with which four electrical actuators are operated for applying and releasing the allocated wheel brake. Each pair, composed of wheel module and power output stage, operates one wheel brake. The wheel modules and the power output stages are interconnected via electrical control- and data lines 10 through 16, check-back signals also being transmitted from the power output stages to the wheel modules via this line connection. The electrical actuators, which are not shown in FIG. 1, are high-current loads and are driven via circuit breakers (e.g., full-bridge output stages). To relieve the actuators thermally when working with static braking forces, and to relieve the vehicle electrical system from the standpoint of energy, retaining brakes (HB1 through HB4) are installed in each wheel brake. The braking force exerted by the actuator is then maintained by the retaining brake, without it being necessary to constantly drive the actuator. These retaining brakes are dimensioned in such a way that they are not numbered among the high-current loads, i.e., that they are already closed or opened with lower currents. Such a retaining brake is provided for each brake actuator. In the preferred exemplary embodiment, the retaining brake of an actuator is supplied with energy from the control unit controlling the actuator as well as from a further control unit. Thus, in FIG. 1, energy lines 18 and 20 run from wheel modules RM1 and RM2 to retaining brake HB1 of the first brake actuator, lines 22 and 24 run from wheel modules RM2 and RM3 to retaining brake HB2, lines 26 and 28 run from wheel modules RM3 and RM4 to retaining brake HB3, and lines 30 and 32 run from wheel modules RM4 and RM1 to retaining brake HB4. The retaining brakes are operated by the respective wheel module allocated to the actuator. In the preferred exemplary embodiment, the retaining brake is closed or opened when energized, and remains in the last state when not energized. It is ensured that the following described switchover allows a release of the brakes, even if one energy circuit fails.

The control system shown is a power brake, so that the two independent energy sources required by law must be present in order that a total failure of the wheel brake does not follow in the event one energy circuit malfunctions. An energy distribution in such a system meeting this standard is described in the following.

Control units RM1 through RM4 are interconnected via a communication system K1 for the exchange of data. In addition, the communication system runs to a central module Z and to an interface S which maintains the communication with other control systems. Via this interface, the elements of the braking system receive data from other control systems such as the drive unit, etc., and give data to these other control systems. At least one brake-pedal actuating signal, from which a driver's braking input is derived, is input via this interface or from central module Z or from the wheel modules themselves. This driver's braking input is corrected, possibly axle-individually and/or wheel-individually, and is used as a setpoint value for adjusting the braking force at the individual wheel brakes within the framework of closed control loops. These are implemented by control units RM1 through RM4 which output corresponding driving signals for power electronics LE1 through LE4 to operate the actuators. They can be braking-force control loops or braking-torque control loops.

The wheel units, formed of power unit (LE1 through LE4) for the actuator, of a retaining brake (HB1 through HB4) and of a control unit (RM1 through RM4) for the signal processing and control are supplied from at least two energy sources (E1 and E2). According to the present invention, the high-current loads for one axle of the vehicle or for the diagonal have a permanent connection. Thus, in the exemplary embodiment shown in FIG. 1, power units LE1 and LE2 are permanently connected to energy source E1, while power units LE3 and LE4 are supplied from energy source E2. This permanent connection with the energy sources is not made for the control units. There, the energy is switched via central module Z. The central module contains a switching element for each element to be supplied with energy, and is itself connected to both energy sources E1 and E2. The central module switches the energy for each control unit on and off individually, and/or has the possibility of switching over the energy source for each control unit from the one energy source to the other. This is coordinated in a computer unit contained in central module Z. Due to the switchover possibility, the energy supply system for the control units is redundantly designed. If it is detected that, for example, energy source E1 has failed, then the computer element in central module Z performs switchover operations which switch the control elements, supplied till now from energy source E1, to energy source E2.

The control units are supplied with energy via energy lines 34 through 40 which run from central module Z to the respective control unit RM1 through RM4.

Retaining brakes HB1 through HB4 are supplied redundantly with energy via energy lines 18 through 32 from the control units, since they require a smaller current.

It is particularly advantageous that the computer unit of central module Z not only switches over the energy sources in the case of a fault, but also switches the energy supply for each control unit on and off individually. This makes it possible to implement special switch-on and/or switch-off strategies of the individual control units or of the overall system. Thus, in one exemplary embodiment, for example, a time-synchronous, controlled connection of the control units to supply is implemented by central unit (module) Z upon switch-on of the overall system, in that, for example, all the control units are connected simultaneously to the vehicle electrical system provided. The same holds true when switching off. Here, the disconnection of the energy for the control units is preferably delayed until they have finished essential work steps and/or have secured important data (after-run). Central module Z likewise switches off individual control units in the case of a fault.

Figure 2:
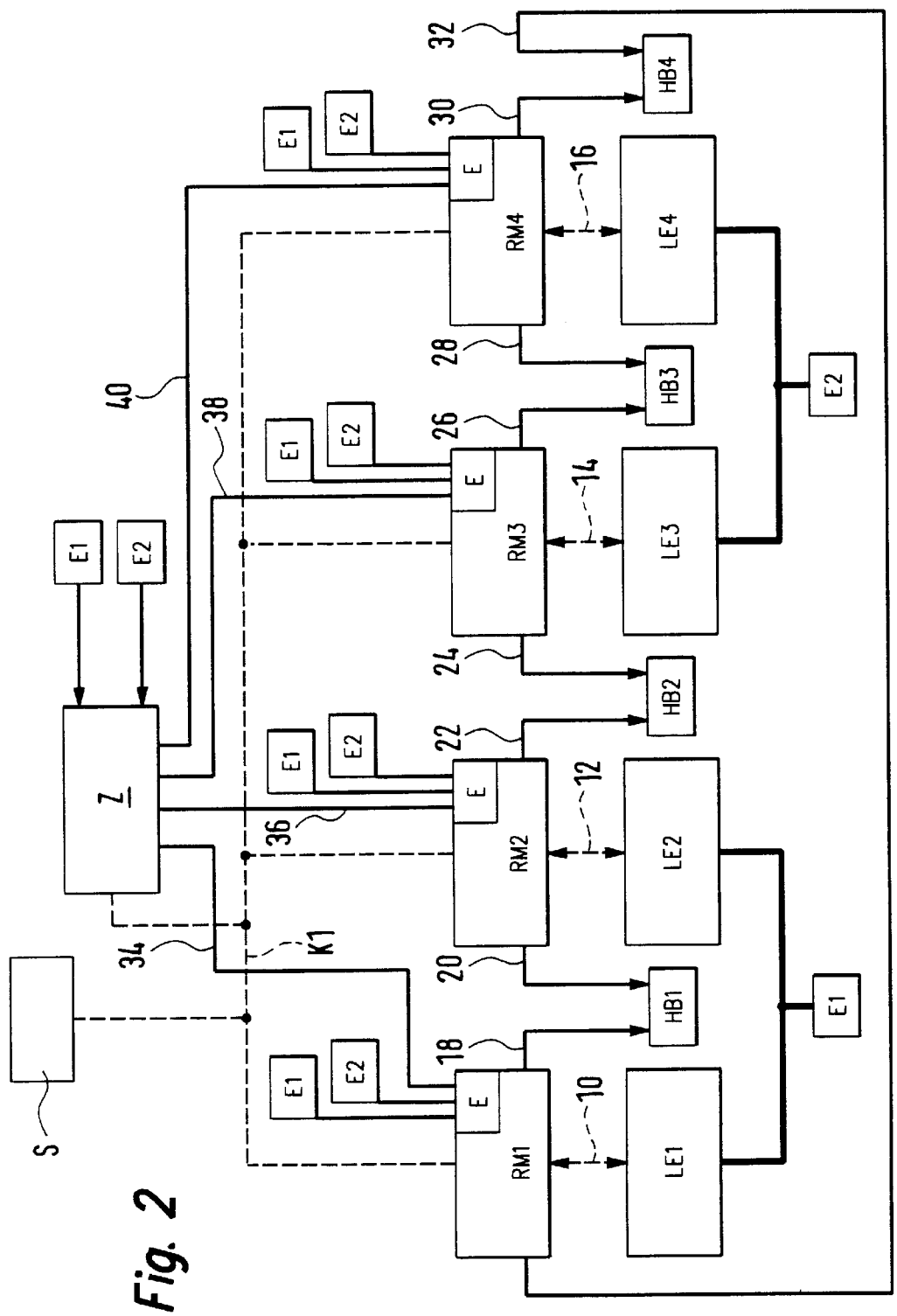
FIG. 2 shows a second exemplary embodiment.

FIG. 2 shows a second exemplary embodiment. The elements and lines already described in FIG. 1 are shown with the same designations. They also fulfill the function described there. Power units LE1 through LE4 and retaining brakes HB1 through HB4 are supplied with energy according to the embodiment of FIG. 1. The important contrast to the exemplary embodiment in FIG. 1 is that at least two energy sources E1 and E2 are connected directly to each control unit RM1 through RM4. Provided in each control unit are switching elements which switch on the energy source provided in the normal case and, in the case of a fault, switch over to another energy source for the energy supply. The functioning method of these switching elements corresponds for each control unit to the means implemented in FIG. 1 in central module Z. To switch on control units RM1 through RM4 from the currentless state, information is necessary which triggers the making operation in each control unit. This signal (prompting signal) is provided by the central module via lines 34 through 40 in response to the system being switched on. In one exemplary embodiment, the energy supply of control units RM1 through RM4 is ensured via these lines until the permanently connected energy sources take over the energy supply of the control units. Therefore, according to one appropriate switch-on strategy, in response to the overall system being switched on, central module Z switches on control units RM1 through RM4 via lines 34 through 40. By being brought into circuit, the control units are informed about the intended start-up of the overall system and then select one of the energy sources E1 or E2 according to the strategy implemented in them. By appropriate switching, the control units are then supplied with energy by the selected energy source, while the energy supplied via lines 34 through 40 is preferably switched off by central module Z. In the case of a fault in the energy source powering a control unit, upon detection of the malfunction, a switchover is made from this energy source to the other. In this context, each control unit operates individually by itself, without consideration of the operations in other control units. In one preferred exemplary embodiment, when one control unit detects a malfunction in an energy source, this information is made available via communication system K1 to the other control units which then initiate measures for check testing and/or carry out a switchover.

What is claimed is:

1. An electrically controlled, decentralized control system in a vehicle, comprising:
    at least two energy sources which are independent of each other;
    least one control unit, at least one of the at least two energy sources supplying the at least one control unit with energy, the at least one control unit being switchably connected to one of the at least two energy sources; and
    at least one high-current load allocated to the at least one control unit, the at least one high-current load being permanently allocated to one of the at least two energy sources, such that the at least one high-current load is not connectable to further of the at least two energy sources.

2. The control system according to claim 1, wherein the at least one control unit includes a plurality of control units situated in a decentralized manner, and the at least one load includes a plurality of loads, each of the plurality of loads being coupled to a respective one of the plurality of control units.

3. The control system according to claim 1, wherein the at least one control unit is permanently connected to the at least two energy sources.

4. The control system according to claim 3, wherein the at least one control unit includes switching elements with whose aid an energy supply of the at least one control unit is at least one of (a) activated from at least one of the at least two energy sources and (b) switched over between the at least two energy sources.

5. The control system according to claim 1, further comprising a central module connected to the at least two energy sources, the central module switching an energy supply to the at least one control unit.

6. The control system according to claim 5, wherein the central module includes switching elements with whose aid the at least one control unit is at least one of (a) connected to at least one of the at least two energy sources and (b) switched over from one of the at least two energy sources to another of the at least two energy sources.

7. An electrically controlled, decentralized control system in a vehicle, comprising:
    at least two energy sources which are independent of each other;
    at least one control unit, at least one of the at least two energy sources supplying the at least one control unit with energy, the at least one control unit being switchably connected to one of the at least two energy sources; and
    at least one high-current load allocated to the at least one control unit, the at least one high-current load being permanently allocated to one of the at least two energy sources;
    wherein the control system is an electromotive braking system which includes a brake actuator and an electrically operable retaining brake which is supplied with energy from at least one of (a) the at least one control unit and (b) at least one further control unit.

8. The control system according to claim 3, further comprising a central module connected to the at least one control unit for initially implementing an energy supply of the at least one control unit upon a start-up of the control system.

9. The control system according to claim 8, wherein the at least one control unit includes a plurality of control units, and the central module at least one of (a) connects the control units individually to the energy sources and (b) switches the control units individually from one of the energy sources to another of the energy sources.

10. An electrically controlled, decentralized control system in a vehicle, comprising:
    at least two energy sources which are independent of each other;
    at least one control unit, at least one of the at least two energy sources supplying the at least one control unit with energy, the at least one control unit being switchably connected to one of the at least two energy sources;
    at least one high-current load allocated to the at least one control unit, the at least one high-current load being permanently allocated to one of the at least two energy sources; and
    a central module connected to the at least one control unit for initially implementing an energy supply of the at least one control unit upon a start-up of the control system;
    wherein the at least one control unit is permanently connected to the at least two energy sources, and the central module at least one of (a) controls a making operation of the at least one control unit, (b) controls a breaking operation of the at least one control unit and (c) separates a defective one of the at least one control unit from an energy supply.

* * * * *

UNITED STATES PATENT AND TRADEMARK OFFICE
CERTIFICATE OF CORRECTION

PATENT NO.   : 6,571,163 B1
DATED        : May 27, 2003
INVENTOR(S)  : Hans Heckmann et al.

It is certified that error appears in the above-identified patent and that said Letters Patent is hereby corrected as shown below:

Column 5,
Line 43, change "least one control unit," to -- at least one control unit, --

Signed and Sealed this

Twenty-second Day of March, 2005

JON W. DUDAS
*Director of the United States Patent and Trademark Office*